Patented Oct. 21, 1941

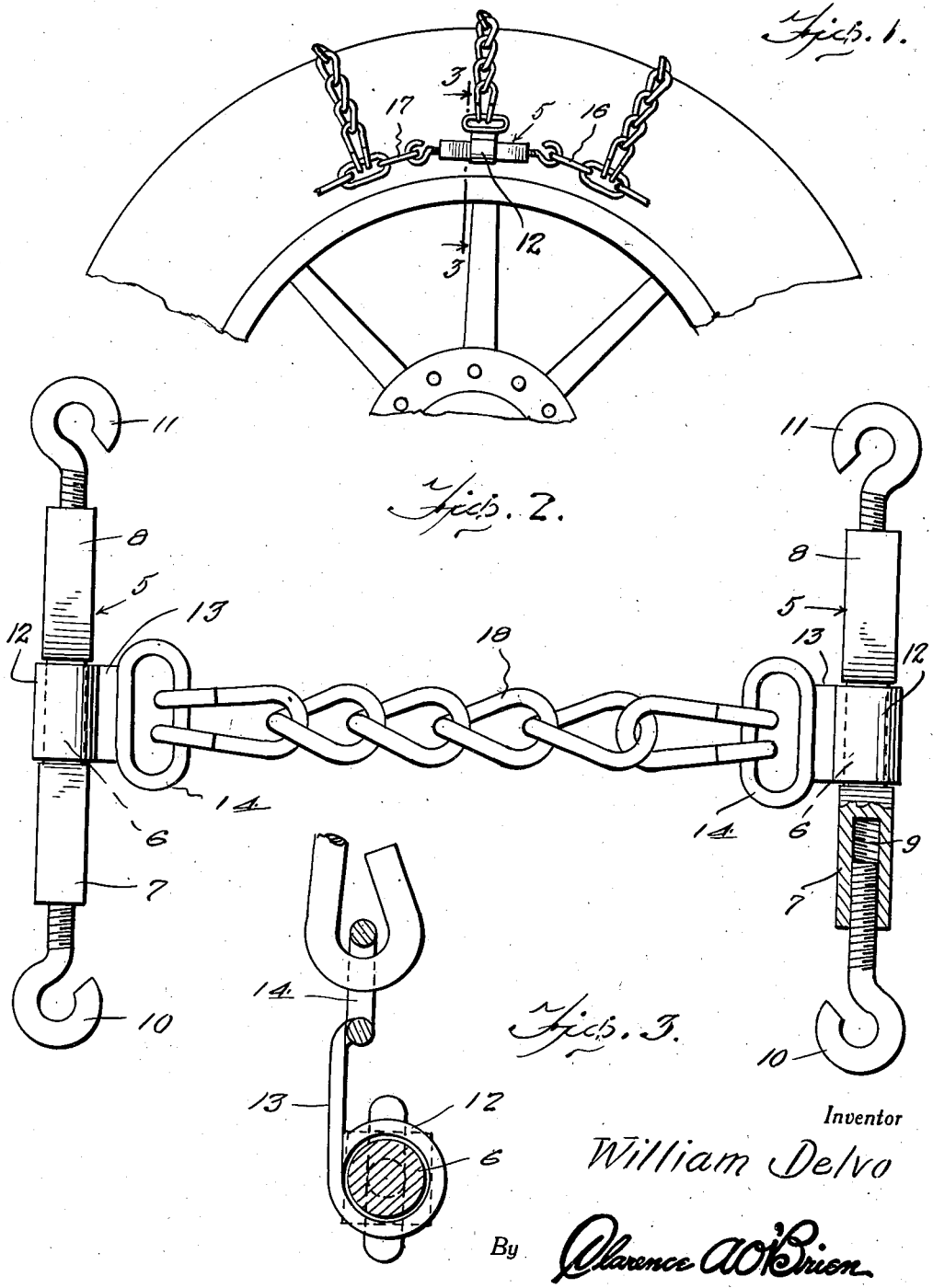

2,259,926

UNITED STATES PATENT OFFICE 2,259,926

TIGHTENING DEVICE FOR ANTISKID CHAINS

William Delvo, Manitowoc, Wis.

Application February 1, 1941, Serial No. 377,058

2 Claims. (Cl. 152—241)

The present invention relates to new and useful improvements in tire chains, more particularly, to devices for tightening or drawing up the side chains of antiskid devices and hence fitting or tightening the chains against the tires.

An object of the invention is to provide a simple, inexpensive and convenient means whereby the side chain may be easily and quickly adjusted to fit the particular tire to which it is applied.

A further object of this invention is to provide, in the same structure, means for the attachment of one of the usual cross chains to the side chains where the ends of the same are secured together.

Other objects and advantages of the invention will become apparent from a study of the following detail description, taken in connection with the accompanying drawing, wherein like characters of reference designate corresponding parts throughout the several views, and wherein—

Figure 1 is a fragmentary side elevational view of a tire and wheel showing an embodiment of my invention applied thereto.

Figure 2 is a top plan view of my invention with parts broken away and shown in section, and Figure 3 is an enlarged detailed sectional view taken substantially on the line 3—3 of Figure 1.

Referring now to the drawing, in detail, it will be seen that the reference numeral 5 designates generally a body portion, preferably constructed of metal, having a round central portion 6 from which extends the square end portions 7 and 8. The square end portions 7 and 8 have axial threaded bores therein as indicated at 9. The bore in the end portion 7 is provided with a right hand thread while the bore in the end portion 8 is provided with a left hand thread. Right and left hand threaded screw hooks 10 and 11 are mounted in the respective threaded bores.

A sleeve 12 is rotatably mounted on the round central portion 6 of the body portion 5 and has a plate-like arm 13 extending therefrom the outer end portion of which is formed into an elongated loop or eye 14.

When the device is mounted in use on an antiskid chain the hooks 10 and 11 are engaged in the free ends of the side chains as shown at 16 and 17 in Figure 1 of the drawing. The body member 5 is then turned to feed the screw hooks 10 and 11 into the threaded bores 9 in the body 5 to draw the ends 16 and 17 of the side chain together.

A conventional cross chain 18 is secured at its end to the eyes 14 of a pair of the chain tighteners when applied to a tire as shown in Figures 1 and 2 of the drawing.

Although I have shown and described herein a preferred embodiment of my invention, it is to be definitely understood that I do not desire to limit the application of the invention thereto, and any change or changes may be made in the materials and in the structure and arrangement of the parts within the spirit of the invention as claimed.

What is claimed is:

1. In a device of the character described, an adjusting device for antiskid tire chains of a type including side and cross chains, said adjusting device comprising a round body portion having elongated end extensions each of which is substantially square in cross section, a rotatable member mounted on said round body portion intermediate the ends thereof, means for securing said rotatable member to the cross chain and an adjustable member at each elongated end extension adapted for connection with the adjacent ends of the side chain.

2. In a device of the character described, an adjusting device for antiskid tire chains of a type including side and cross chains, said adjusting device comprising a rod-like body portion having elongated end extensions each of which is substantially square in cross section, a sleeve mounted on said rod-like body portion between the end extensions, means for securing said sleeve to the cross chain and an adjustable member at each end extension adapted for connection with the adjacent ends of the side chain.

WILLIAM DELVO.